July 11, 1950 L. H. L'HOLLIER 2,515,050
METHOD OF MAKING FULL-LINED BOOTS
Filed March 21, 1947 2 Sheets-Sheet 1
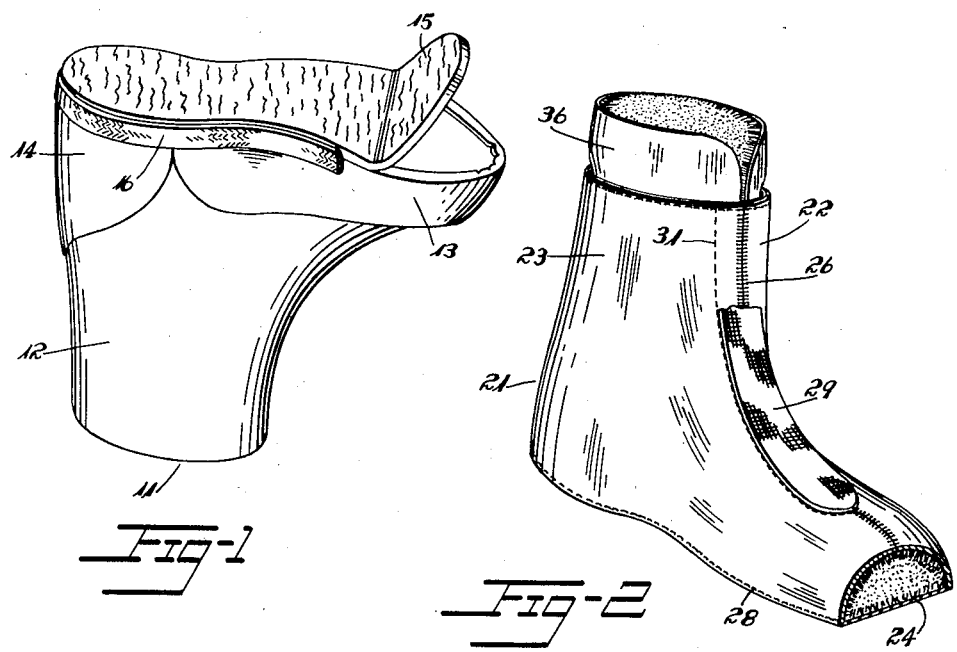
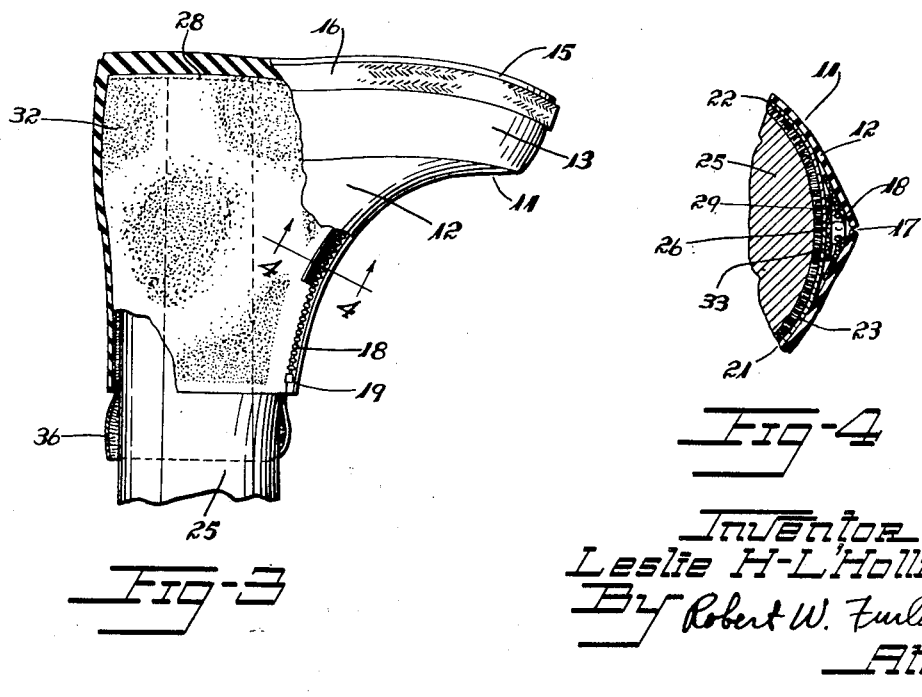
Inventor
Leslie H. L'Hollier
By Robert W. Furlong
Atty.

July 11, 1950          L. H. L'HOLLIER          2,515,050
METHOD OF MAKING FULL-LINED BOOTS
Filed March 21, 1947          2 Sheets-Sheet 2
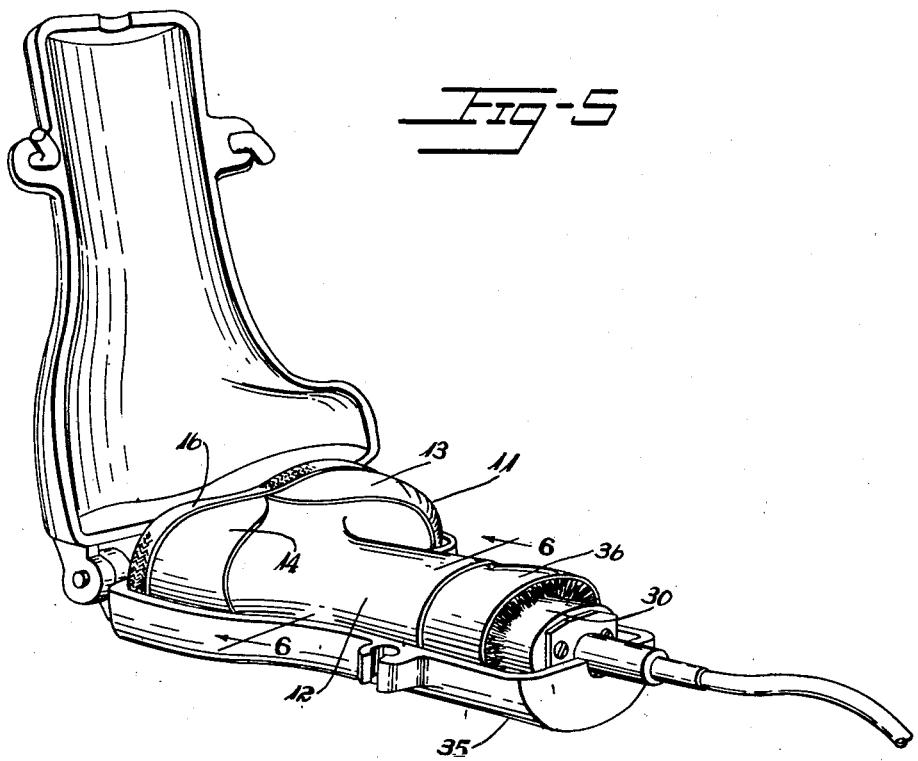
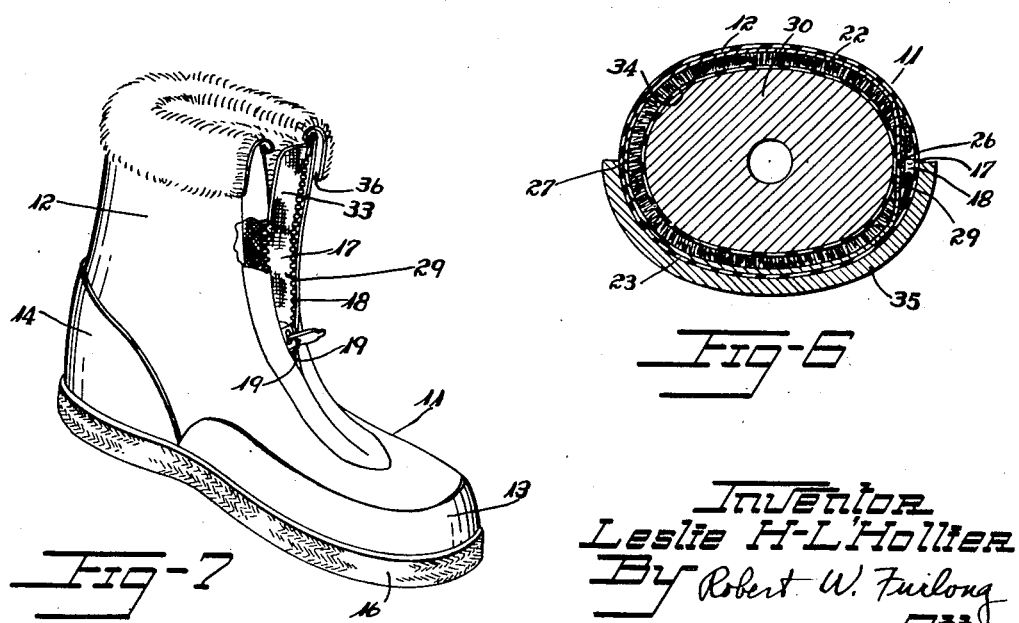
Inventor
Leslie H. L'Hollier
By Robert W. Furlong
Atty.

Patented July 11, 1950

2,515,050

UNITED STATES PATENT OFFICE 2,515,050

METHOD OF MAKING FULL-LINED BOOTS

Leslie H. L'Hollier, Waltham, Mass., assignor to The B. F. Goodrich Company, New York, N. Y., a corporation of New York Application March 21, 1947, Serial No. 736,256

3 Claims. (Cl. 12—142)

This invention relates to lined hollow rubber articles such as full-lined boots and other similar articles of footwear and to a method of making the same and particularly to a method of making a rubber boot with a lining of a heat-sensitive material such as leather, shearling, synthetic fabrics, wool fabrics, and the like.

It is an object of this invention to provide a method for constructing a boot with a sole and an upper comprising vulcanized rubber and having a full, sock-like lining of a heat-sensitive material. Another object is to provide a method for constructing such a boot so that the full lining will not be damaged by the heat necessary to vulcanize the rubber sole and upper. Other objects will be apparent from the description which follows.

Heretofore, the assembling of a high rubber upper in correct alignment with a sock-like lining extending above the ankle has been not only difficult but also impractical for commercial production; especially was it difficult to properly align the lips of the lining with the opening of the outer rubber upper. If perfect alignment was not obtained on the first attempt, it was impossible to realign the members because of the tacky cement used to attach the lining to the upper.

In my invention, the difficulty of aligning the rubber shell and the lining has been substantially eliminated. According to one embodiment of my invention, the lining is assembled and placed over a collapsible last. The rubber outer shell having a vent opening is separately assembled of unvulcanized rubber and vulcanized. After coating both the outer surface of the lining and the inner surface of the vulcanized rubber shell with a suitable adhesive cement, the shell is pulled over the lining into adhesive engagement with it. In order to provide a tongue, the portion of the lining underlying the vent opening may be provided with a reenforcing facing strip; this strip is left free of adhesive on its outer surface. After the lining and rubber shell are adhesively engaged, the lining is severed along one side of the tongue facing to form a tongue under the opening of the rubber upper, and the collapsible last is removed. Cutting the lining after the rubber shell and lining have been adhesively engaged is one of the important steps of this invention, since a one-piece lining is more easily aligned with the rubber shell. The semi-finished boot is then slipped over a last which has previously been covered with an expansible sock, and after closing the boot fastening, the sock is expanded to force the lining against the rubber shell. The cement is allowed to set without further heating of the boot.

This invention is particularly applicable to making a fleecy-lined rubber boot which has an upper comprising a vulcanizable rubber that extends to the top of the boot, well above the ankle. The fleecy lining of the boot would be adversely affected by the high temperatures ordinarily employed for vulcanizing the rubber portions, so that the usual method of assembling the boot and then vulcanizing the entire boot assembly including the lining would be unsatisfactory.

This invention may be easily understood by referring to the accompanying drawings which illustrate a rubber boot with a fleece lining and a method of making the same.

Fig. 1 is a perspective view of the rubber shell consisting of a sole and several elements comprising an upper;

Fig. 2 is a perspective view of the full shearling lining;

Fig. 3 is a side view of the boot being assembled on a collapsible last with a portion of the rubber shell and lining cut away for clarity;

Fig. 4 is a cross-sectional view taken on line 4—4 of Fig. 3, showing the rubber shell, full lining, tongue, and slide fastener;

Fig. 5 is a perspective view of the boot and inflatable last in a close-fitting retainer which is in the open position;

Fig. 6 is a cross-sectional view on line 6—6 of Fig. 5 showing the inflatable last, rubber boot, and the lower half of the retainer; and Fig. 7 is a perspective view of a completed boot with the cuff attached.

In carrying out the method of this invention, the rubber shell 11 is fabricated of a vulcanizable rubber upper member 12 to which are applied a toe-reinforcing strip 13, a counter-reinforcing member 14, a sole 15, and a foxing strip 16. The rubber shell 11 is provided with a front vent opening 17 which is equipped with a slide fastener 18 secured along the inner side of the vent opening of the shell and so arranged that the edges 19 of the vent opening 17 are brought together in contiguous association when the slide fastener 18 is closed. The rubber shell is vulcanized in any usual manner, as in hot air or steam, after its fabrication is complete, while maintaining it on a last in its finished shape.

The shearling lining 21 of Fig. 2 is formed by assembling the upper members 22 and 23 together with a sole member 24, and a decorative cuff 36. The upper members 22 and 23 are sewed with butt seams 26 and 27 centered at the front and rear, and the sole member 24 is secured to the upper members 22 and 23 by a stitched seam 28 which may be overcast, butted or closed. The lining 21 is then mounted on a collapsible last of conventional construction, as the three-piece last 25. A facing strip 29 of rubber, rubber-coated fabric, plastic-coated fabric, or the like is cemented, by means of a latex or rubber cement or any other suitable adhesive, along the front of the lining from the top of the upper to the instep. This strip is so positioned as to underlie the vent opening of the rubber shell 11 in the completed boot and to serve as a reinforcement and facing for the lining at that point. A line of perforations 31 is then made in the lining along one edge of the facing strip 29 so that the lining may readily be cut and torn after the lining and shell have been united, to form a tongue member integral with the lining. The outer surface of the lining 21, except for the portion covered by the facing strip, is then coated with an adhesive designated by the stippled area 32 in Fig. 3. This adhesive preferably consists of a pressure-sensitive adhesive or a latex or rubber cement vulcanizable at room temperature.

The slide fastener 18 of the rubber shell is opened and the inner surface of the shell is then coated with the same or a similar cement as that used to coat the outside of the lining 21. After the cement has dried to a tacky consistency, the rubber shell 11 is pulled over the lining 21 as shown in Fig. 3 and a preliminary contact and adhesion is formed. The three-piece last 25 is removed and the lining 21 is cut or torn along the perforations 31 to form a tongue 33 which consists of the shearling lining 21 and the tongue facing strip 29 which lies beneath the vent opening in the rubber shell 11. It should be noted that since the line of perforations along the edge of the facing strip is offset from the vent opening in the outer shell, exact positioning of the shell with respect to the lining is not essential. A slight variation in the relative position of the two members under these circumstances will cause no difficulty.

The semi-finished boot is now mounted on a last 30 which has been previously covered with an expansible rubber sock 34 as shown in Fig. 6, the upper margin of the sock being secured to last 30 around its periphery. The slide fastener 18 on the rubber shell 11 is closed, and the rubber sock 34 is then expanded to press the shearling lining 21 and the rubber shell 11 in close and permanent adhesive engagement. If desired, a close-fitting retainer 35 on the outside of the boot may be provided to prevent the rubber shell from expanding and to provide an outer resistance to the inner pressure created by the expanded rubber sock 34. The close-fitting retainer 35 as shown in Fig. 5 comprises a hinged mold having a cavity complementary to the outer contour of the finished boot. After the shell and lining have been thus pressed into close engagement throughout, the retainer 35 is opened and the boot is removed from last 30. The boot is allowed to stand at room temperature for a sufficient period of time to permit the rubber adhesive to set up or to become vulcanized. This period will vary from several minutes to many hours, depending upon the particular adhesive composition employed.

This invention may be used in the manufacture of any hollow article which is made both of vulcanizable rubber and of lining material subject to injury by hot-vulcanization temperatures. Its most important application is in the manufacture of article of footwear, although it may also be used in the manufacture of gloves or other articles of clothing. The cement used may be any rubber cement such as one made from natural rubber, synthetic rubber, latex, and the like, and which is capable of providing good adhesion at room temperature. Natural or synthetic rubber adhesives which are vulcanizable at room temperature, many of which are well-known in the art, are particularly preferred. Other non-rubber adhesives may be used, but they produce generally less satisfactory results. The rubber employed in this invention may be either natural or synthetic rubber, and these rubbers may be reinforced with textile fabric or the like. The lining may be manufactured from any of a number of materials such as fleecy leather, wool fabric, wool and cotton fabric, synthetic fabrics, shearling, and the like. The slide fastener used may be a pressure sealing fastener to provide an absolutely waterproof article of footwear, although any other suitable closure means for the vent opening may be employed instead of a slide fastener. The tongue facing strip may be made of rubber, fabric, rubber-impregnated fabric, plastic-coated or impregnated fabric, or any other suitable material. Although the method of forming a tongue by cutting and tearing the lining off-center along perforations next to the facing strip has been described, it should be pointed out that the perforating step may be eliminated, if desired, or postponed until after the lining and the shell have been adhesively engaged. Furthermore, the facing strip may also be eliminated and the lining may be severed at the center point underneath the vent opening of the shell, for example along the center seam 26.

The method described makes it commercially feasible to make a full-lined rubber boot with the rubber shell extending to the very top of the boot. This type of footwear with or without a pressure-sealing slide fastener makes an excellent hunting, aviation, sport, or dress boot.

Although a particular method of manufacture has been outlined, it is my intention that the invention be not limited by this example nor by the materials of this example, but to include all of the obvious variations and modifications falling within the spirit and scope of the appended claims.

I claim:

1. In a method of making a full-lined boot or other article of footwear the steps which comprise providing a full lining of a heat-sensitive material, adhering a facing strip to the front of said lining, providing a vulcanized rubber shell which comprises a sole and one or more elements constituting an upper having a front vent opening, inserting said lining in said shell and adhering the two together in both the sole and upper regions throughout the coextensive areas of said lining and shell except along the marginal zones adjacent said opening over said facing strip, severing said lining along one margin of said facing strip, mounting said shell and lining on a last covered by an expansible rubber sock and confining the outer surface of said shell in a mold, and expanding said rubber sock to force said lining and shell into adhesive engagement.

2. A method of making a full-lined boot or other article of footwear which comprises providing a vulcanized rubber shell comprising a sole and an upper having a front vent opening, providing a full-lining with attached cuff of a heat-sensitive material, securing a facing strip to the front of said lining, applying adhesive to the entire outer surface of said lining exclusive of said facing strip and said cuff and to only the corresponding inner surface of said rubber shell, pulling said shell over said lining, thereafter severing said lining under the rubber shell vent opening along a margin of said facing strip to provide staggered vent openings in said shell and lining, mounting said assembled shell and lining on a last covered with an expansible rubber sock, confining the outer surface of said shell in a mold and expanding said rubber sock upon which said lining is mounted to press said lining and shell into adhesive engagement.

3. A method of making a full-lined boot or other article of footwear which comprises providing a vulcanized rubber shell comprising a sole and an upper having a vent opening, providing a full lining of heat-sensitive material, applying adhesive to the inner surface of said shell and to the outer surface of said lining exclusive of the marginal zones adjacent the vent opening of said shell and the corresponding area of said lining, assembling said lining and shell with their adhesive-coated surfaces in contact and severing said lining along a line staggered relative to said shell vent opening to provide staggered vent openings in said shell and said lining, mounting said assembly on a last covered with an expansible rubber sock, confining the outer surface of said assembly in a mold and expanding said rubber sock upon which said assembly is mounted to press said lining and shell into adhesive engagement.

LESLIE H. L'HOLLIER.

REFERENCES CITED

The following references are of record in the file of this patent:

UNITED STATES PATENTS

| Number | Name | Date |
|---|---|---|
| 878,749 | Schulze | Feb. 11, 1908 |
| 1,820,149 | Mecklenburg | Aug. 25, 1931 |
| 1,894,610 | Joy | Jan. 17, 1933 |
| 1,952,473 | Taber | Mar. 27, 1934 |
| 1,969,962 | Bodle | Aug. 14, 1934 |
| 2,244,030 | Teehan | June 3, 1941 |
| 2,365,103 | Olson | Dec. 12, 1944 |